United States Patent
Lim et al.

(10) Patent No.: US 8,549,731 B2
(45) Date of Patent: Oct. 8, 2013

(54) METHOD OF MANUFACTURE OF A VARIABLE INDUCTANCE INDUCTOR

(75) Inventors: Michele H. Lim, Blacksburg, VA (US); J. D. van Wyk, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 582 days.

(21) Appl. No.: 12/577,415

(22) Filed: Oct. 12, 2009

(65) Prior Publication Data
US 2010/0026440 A1   Feb. 4, 2010

Related U.S. Application Data

(62) Division of application No. 11/357,424, filed on Feb. 21, 2006, now Pat. No. 7,638,988.

(51) Int. Cl.
*H01F 7/06* (2006.01)

(52) U.S. Cl.
USPC ............... 29/605; 29/602.1; 29/606; 29/607; 336/178; 336/200; 336/212; 336/223; 336/232

(58) Field of Classification Search
USPC ......... 29/602.1, 605–607, 829, 832; 205/119, 205/122; 216/67; 336/178, 200, 212, 223, 336/232
See application file for complete search history.

(56) References Cited

U.S. PATENT DOCUMENTS

| | | | |
|---|---|---|---|
| 4,547,961 A | 10/1985 | Bokil et al. | |
| 4,785,345 A | 11/1988 | Rawls et al. | |
| 5,027,255 A | 6/1991 | Zeitlin et al. | |
| 5,111,382 A | 5/1992 | Jones et al. | |
| 5,532,667 A | 7/1996 | Haertling et al. | |
| 5,644,327 A | 7/1997 | Onyskevych et al. | |
| 5,982,160 A | 11/1999 | Walters et al. | |
| 6,323,626 B1 | 11/2001 | Raiser | |
| 6,350,334 B1 * | 2/2002 | Shigemi et al. | 156/89.12 |
| 6,570,477 B2 * | 5/2003 | Park et al. | 336/200 |
| 6,900,708 B2 | 5/2005 | White et al. | |
| 6,914,513 B1 | 7/2005 | Wahlers et al. | |
| 7,068,124 B2 | 6/2006 | White et al. | |
| 2004/0041303 A1 * | 3/2004 | Kim et al. | 264/320 |
| 2005/0028601 A1 | 2/2005 | Pedersen et al. | |

(Continued)

OTHER PUBLICATIONS

Z. Liang et al.; "Embedded Power-a Multilayer Integration Technology for Packaging of IPEMs and PEBBs"; 0-7803-6437-6/00/$10.00; 2000 IEEE; pp. 41-44.

(Continued)

*Primary Examiner* — Paul D Kim
(74) *Attorney, Agent, or Firm* — Whitham, Curtis, Christofferson & Cook, P.C.

(57) ABSTRACT

Ceramic inductors are made from stacked sheets of co-fired ceramic. At least one of the ceramic sheets has a slot with a conductor disposed in the slot. The conductor has a thickness equal to a thickness of the ceramic sheet containing the slot. The conductor has a large thickness (compared to prior art co-fired ceramic inductors) and therefore can carry large currents. The present ceramic inductor can be used in power electronics applications due to the ability to carry large currents. The present ceramic inductor preferably has an inductance that decreases with increasing current. A decreasing inductance characteristic tends to increase energy efficiency in a voltage regulator when the inductor is used as an output inductor. Specifically, the variable inductance tends to substantially increase energy efficiency at low current loads without adversely affecting efficiency at high loads.

7 Claims, 6 Drawing Sheets

(56) References Cited

U.S. PATENT DOCUMENTS

| | | |
|---|---|---|
| 2005/0229385 A1 | 10/2005 | Pleskach et al. |
| 2006/0109632 A1 | 5/2006 | Berlin et al. |
| 2007/0064429 A1 | 3/2007 | Mazzochette et al. |

OTHER PUBLICATIONS

A. Pernia et al.; "Thick-Film Hybrid Technology for Low-Output-Voltage DC/DC Converter"; IEEE Transactions on Industry Applications, vol. 40 No. 1, Jan./Feb. 2004; pp. 86-93.

Z. Liang et al.; "Integrated Packaging for a High Frequency Voltage Regulator Application"; NSF-ERC Center for Power Electronics System, Virginia Polytechnic Institute and State University, 2005.

Z. Liang et al.; "Embedded Power Technology for IPEMs Packaging Applications"; 0-7803-6618-2-01-$10.00, 2000 IEEE; pp. 1057-1061.

Kulke et al.; "LTCC—Multilayer Ceramic for Wireless and Sensor Applications"; pp. 1-8, 2001.

G. Slama; "Low-Temp Co-Fired Magnetic Tape Yields High Benefits"; Power Electronics Technology, Jan. 2003; pp. 30-34.

* cited by examiner

METHOD OF MANUFACTURE OF A VARIABLE INDUCTANCE INDUCTOR

CROSS-REFERENCE TO RELATED APPLICATIONS

This application is a divisional of U.S. patent application Ser. No. 11/357,424, filed Feb. 21, 2006 which issued as U.S. Pat. No. 7,638,988 on Dec. 29, 2009, and which is incorporated herein by reference.

FIELD OF THE INVENTION

The present invention relates generally to low temperature co-fired ceramic (LTCC) inductors. Unlike prior LTCC inductors, the present inductors have a high current-carrying capability. Also, the invention relates to a voltage regulator (e.g. buck converter) having an output inductor with a variable inductance that decreases with increasing output current. The variable inductance characteristic provides improved energy efficiency.

BACKGROUND OF THE INVENTION

LTCC inductors have been known and used for several decades. Typically, LTCC inductors are low-power and low-current devices used for RF filters, tuners, and the like. LTCC inductors are not conventionally used for high current applications such as in power supplies or voltage regulators.

LTCC inductors and transformers are made by screen-printing conductive ink patterns (e.g. comprising silver particles) on sheets of green (i.e. unfired) ferromagnetic ceramic material. Multiple green sheets with printed conductor patterns are stacked and then fired at high temperature, causing the sheets and conductive ink to bond by sintering. The printed conductors carry current parallel to the ceramic sheets. Vias filled with conductor paste carry currents perpendicular to the sheets. U.S. Pat. Nos. 5,532,667, 4,785,345, 4,547,961, and 6,914,513 describe examples of various LTCC inductors and transformers. LTCC inductors and transformers are widely used because they are inexpensive, small, and reliable. LTCC inductors also have high magnetic coupling, and accurately tunable magnetic properties.

However, one problem with the known methods for making LTCC inductors is that current and power handling capability is severely limited because the conductors must be applied as a printed film. Typically, the conductive ink is about 0.001" thick, and the green sheets are about 0.002-0.005" thick. The conductive ink is applied as a printed film because the green ceramic sheets must be close enough to fuse by sintering. Consequently, the conductive wiring formed from the conductive ink is too thin to carry large currents. These limitations have prevented LTCC inductors from being used in power electronics applications. This is unfortunate because LTCC inductors would otherwise provide many benefits in power electronics applications and other circuits where large currents are present. For example, the small size and high reliability of LTCC inductors make them attractive for use in voltage regulator circuits.

It would be an advance in the art to provide LTCC inductors and transformers that can carry large currents. Such LTCC inductors could be widely used in power electronics circuits and other circuits having large currents.

Voltage regulators are commonly used in power supply circuits for microprocessors, communication electronics and the like. Microprocessors are switched between low-power mode (e.g. "sleep" mode) and higher power modes of operation. Voltage regulators must be able to handle the dramatic changes in operating power consumption, and at the same time maintain high energy efficiency in both high and low power nodes. One significant problem is that microprocessors are typically in low power mode most of the time, and the energy efficiency tends to be very in low power mode.

It would be an advance in the art of power electronics to increase the low power mode energy efficiency of voltage regulator circuits. It would be particularly beneficial to increase the energy efficiency of the low power mode without adversely affecting the energy efficiency of the high power mode.

SUMMARY OF THE INVENTION

The present invention includes a ceramic inductor having a plurality of ceramic sheets. The sheets are stacked in parallel and sintered together. At least one ceramic sheet has a slot cut through its entire thickness. A conductor is disposed in and fills the slot. The conductor extends in a direction parallel to the sheet and carries current parallel to the sheet. The conductor is as thick as the sheet and therefore has a relatively large cross sectional area and can carry large currents.

Vias can be disposed in a ceramic sheet adjacent to the sheet having the slot and conductor. Vias provide current flow in a direction perpendicular to the ceramic sheets.

The ceramic sheets can be made of ferrite, and the conductor can be made of sintered silver or copper particles.

The ceramic sheets can be essentially monolithic, which means that the boundaries between the sheets may be invisible or undetectable (i.e. the boundaries may be obliterated by the sintering process).

The ceramic sheets can have a thickness of about 0.003 to 0.05 inches, for example. Preferably, the ceramic sheets comprise a material with a distributed air gap. Each ceramic sheet can comprise a stack of very thin ceramic layers having the same slot of hole pattern. For example, each ceramic layer can be about 0.003 inches thick. and each ceramic sheet can comprise 2-10 ceramic layers.

The present invention also includes a method for making inductors. In the present method, a conductive paste (e.g. comprising sinterable metal particles and a vehicle) is inserted into a ceramic sheet having a slot.

The present ceramic inductors will have an inductance that decreases with increasing current, provided that the ferromagnetic ceramic material has a distributed air gap, and the conductor is sufficiently narrow. Such variable-inductance inductors improve energy efficiency in voltage regulators when they are used as the output inductors.

The present invention includes a voltage regulator having at least one electronic switch and an output inductor receiving electrical power from the switch and providing electrical power to a load. The output inductor has a variable inductance that decreases with increasing current provided to the load. Preferably, the inductance decreases monotonically (i.e. there is no range of currents over which the inductance increases with increasing current).

The voltage regulator has a maximum rated output current. Preferably, the inductance at the maximum rated output current is less than 90%, 75%, 50%, or 35% of the inductance at zero current. Large decreases in inductance are generally preferred because they typically provide the greatest energy efficiency improvement.

The variable inductance inductor can be a co-fired ceramic inductor according to the present invention. The ceramic inductor can comprise a ceramic material with a distributed air gap.

DETAILED DESCRIPTION

The present invention provides a co-fired ceramic inductor or transformer with a high current carrying capability. The present ceramic inductor has a relatively thick conductor that occupies the entire thickness of a ceramic sheet. Unlike prior art LTCC inductors, the conductors of the present invention are not screen printed films. In the present invention, a ceramic sheet has a slot (i.e. an elongated hole extending through the sheet) with a conductor filling the slot. The conductor has a thickness equal to a thickness of the ceramic sheet. Consequently, the conductor has a relatively large thickness and cross sectional area and can carry a large current.

The present ceramic inductors are particularly well suited for use in DC-DC converters and voltage regulators (e.g. buck regulators, boost regulators, full bridge regulators, switching regulators, and the like). The present ceramic inductors preferably have an inductance value that decreases with increasing current. A variable inductance will result if the inductor has a distributed air gap and if the conductor has a relatively small width. The variable inductance characteristic provides improved performance (e.g. higher energy efficiency, particularly at low current) when the present inductor is employed as an output inductor in a voltage regulator such as a buck converter. The present invention includes voltage regulators having a variable output inductance that decreases with increasing current.

Figure 1:
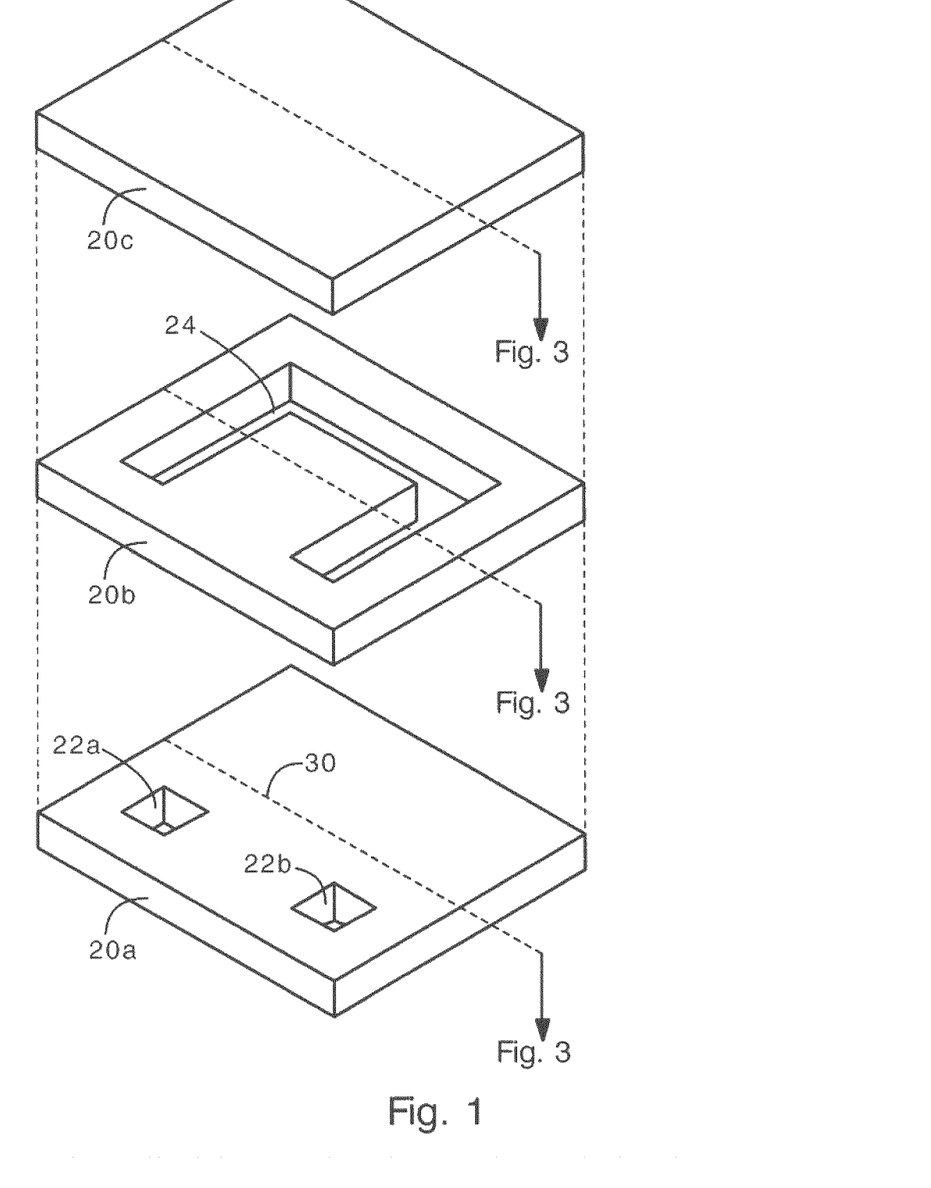
FIG. 1 shows an exploded view of a ceramic inductor according to the present invention.

FIG. 1 shows an exploded view of an exemplary ceramic inductor according to the present invention. In the specific example of FIG. 1, the inductor comprises three ceramic sheets 20a 20b 20c. The sheets are preferably made of a ferromagnetic or ferrimagnetic material such as ferrite or glass-bonded ferrite. Bottom sheet 20a includes via holes 22a 22b that extend through the bottom sheet 20a. Middle sheet 20b includes a slot 24 that extends through the middle sheet 20b. Top sheet 20c is a solid sheet that does not contain holes or slots. The top sheet is optional but preferred in the invention.

The via holes 22a 22b and slot 24 are filled with an electrical conductor. The electrical conductor can comprise sintered silver particles, for example. For clarity, the electrical conductor material is not shown in FIG. 1.

The sheets 20a 20b 20c are sintered such that they are mechanically bonded and magnetically coupled. The holes 22a 22b and slot 24 are joined such that the conductor filling the holes 22a 22b and slot 24 is continuous. The sheets can each be about 0.005 to 0.050 inches thick, for example. Typically, the sheets will be made from ceramic layers (not shown) that are each about 0.003" or about 75 microns thick.

Figure 2:
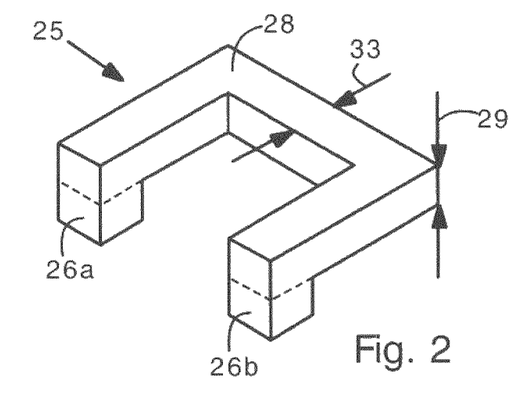
FIG. 2 shows in isolation the conductor embedded in the ceramic sheets illustrated in FIG. 1.

FIG. 2. shows an isolated perspective view of an electrical conductor 25 filling the holes 22a 22b and the cut out slot 24 of FIG. 1. The conductor comprises vias 26a 26b and a U-shaped section 28 filling the slot 24. Section 28, which fills the slot 24, occupies the full thickness of the middle sheet 20b. The U-shaped section 28 is not a thin printed conductor film printed on top of a ceramic sheet. Instead, in the present invention, the section 28 is cast in the slot 24 and therefore the section 28 has a thickness 29 equal to the thickness of the middle sheet 20b. Consequently, the section 28 has a large thickness, large cross-sectional area, low ohmic resistance, and is therefore capable of carrying large electrical currents. The present inductors can therefore be used in voltage regulators, power supplies and other circuits requiring inductors capable of carrying large electrical currents.

The slot 24 is connected to vias 26 at each end such that electrical current flows in a direction parallel with the ceramic sheets 20a 20b 20c. Preferably, the slot 24 is longer than a thickness of the sheet 20b containing the slot.

The U-shaped section 28 of the electrical conductor 25 can be made of the same material commonly used for vias 26a 26b as known in the art. For example, the U-shaped section can be made of sintered silver particles derived from a paste comprising silver particles, binding agents and a solvent such as an alcohol. Sinterable metallic conductive pastes compatible with LTCC inductor devices are well known in the art.

The section 28 has a conductor width 33. Typically, the width 33 is greater than (e.g. 3× or 4× greater) the thickness 29. The conductor width 33 influences the inductance of the present ceramic inductor. Of course, a small width 33 will result in a large inductance, and a large width 33 will result in a small inductance, as known in the art. Also, it is noted that the present inductors have an inductance that decreases with increasing current. The rate of decrease in inductance is dependent on the width 33. A small width 33 results in rapidly decreasing inductance with increasing current; a large width 33 results in a slowly decreasing inductance with increasing current.

Figure 3:
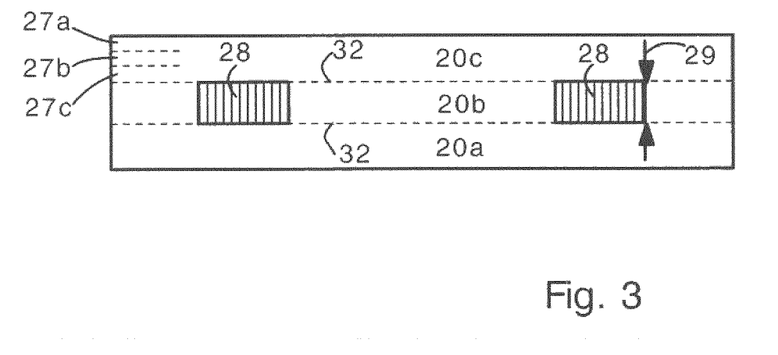
FIG. 3 shows a cross sectional view of the inductor of FIG. 1 cut across line 30.

FIG. 3 shows a cross sectional view of the present inductor cut along dotted lines 30 illustrated in FIG. 1. The U-shaped section 28 has the same thickness 29 as the middle sheet 20b. The sheets 20a 20b 20c are bonded by sintering. Each ceramic sheet can comprise several ceramic layers 27a 27b 27c, with each layer about 0.001 to 0.005 inches thick. When cut in cross section, faint boundaries 32 might or might not be apparent where the sheets 20a 20b 20c are bonded. Of course, the distance between the boundaries 32 indicates the thickness of the middle sheet 20b having the slot 24. Typically, the ceramic sheets will have a thickness of about 0.010 to 0.05 inches thick.

The slot 24 and electrical conductor 25 can have many different shapes. For example, the slot 24 and corresponding conductor can be straight, a spiral, serpentine or other shapes.

Figure 4A:
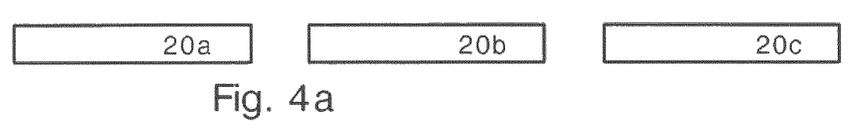
FIGS. 4a-4d illustrate a preferred method for fabricating the present ceramic inductors.

FIGS. 4a-4d illustrate a preferred method for making the present ceramic inductor illustrated in FIGS. 1, 2, and 3. The preferred steps proceed as follows:

FIG. 4a (side view): Three green ceramic sheets are provided. The ceramic sheets can be about 0.003 to 0.20" thick, for example. The sheets can be made by casting or extrusion of ceramic particle slurry, as known in the art. Each sheet can comprise several laminated ceramic layers, with each ceramic layer separately formed by casting or extrusion.

Figure 4B:
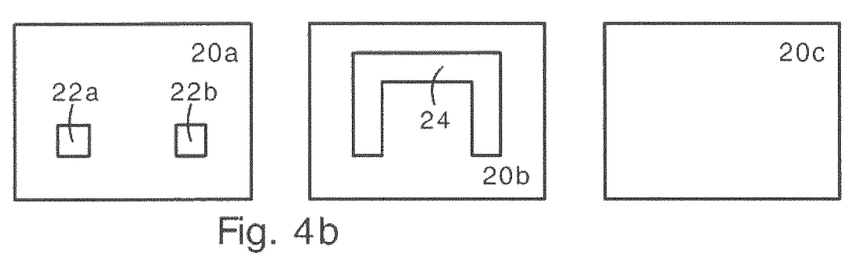

FIG. 4b (top view): Holes 22a 22b for vias are punched or laser cut in the bottom sheet 20a. Slot 24 for section 28 is punched or laser cut in the middle sheet 20b. Top sheet 20c does not have holes or slots. If the sheets comprise multiple ceramic layers, then the layers can be punched or cut before or after lamination.

Figure 4C:
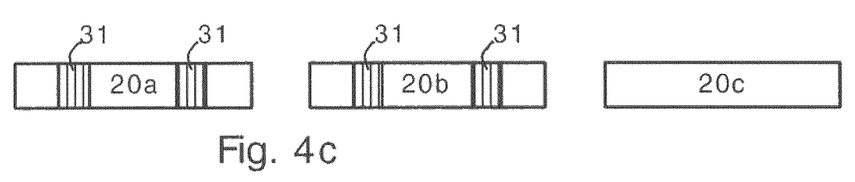

FIG. 4c (cross-sectional side view): Conductive paste material 31 is inserted into the holes 22a 22b and slot 24. The conductive paste material 31 can be pressed into the slot with a scraper or a stencil and screening process can be used to insert the paste.

Figure 4D:
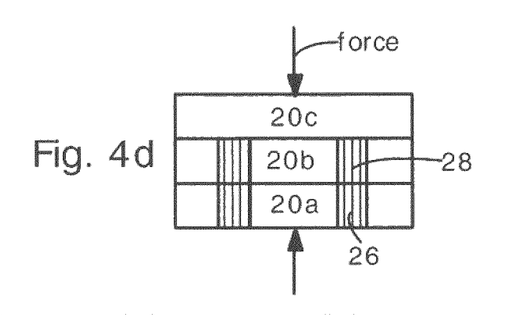

FIG. 4d (cross-sectional side view): The ceramic sheets are stacked such that the holes 22a 22b and slot 24 are aligned. The stacked sheets are sintered at high temperature. Compressive force may be applied before or during sintering.

It is noted that coupled inductors and transformers can also be fabricated according to the present invention.

In the practice of this invention, the slots extend through the entire thickness of a ceramic sheet. The slots of the present invention provide space for conductive material that conducts electrical current in a direction parallel with the ceramic sheets. The slots of the present invention can be curved or straight.

The present inductors are particularly well suited for use in power electronics applications where high currents are required.

Also, it is noted that the present inductors can be very thin (e.g. less than 1 mm or 2 mm in thickness) while providing high current carrying capability. The present inductors can function as a circuit board or substrate (e.g. metal circuit traces can be printed on an external surface of the inductor).

Figure 5:
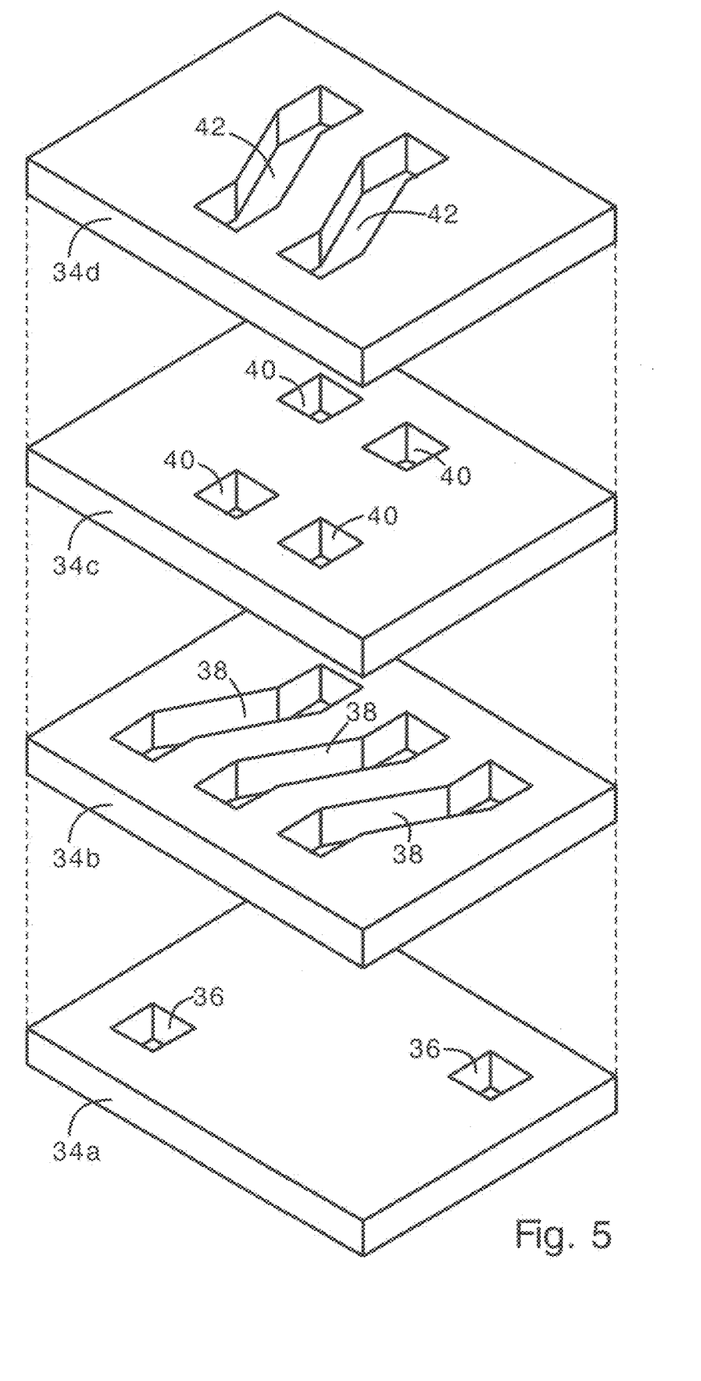
FIG. 5 shows an exploded view of a 2½ turn inductor according to the present invention.

Also, the present inductor can have multiple ceramic sheets with slots 24 forming more complex conductor shapes. FIG. 5, for example, shows an exploded view of 4 ceramic sheets 34a 34b 34c 34d forming a 2½ turn inductor. Bottom sheet 34a has holes 36 for vias. Sheet 34b has slots 38 providing the bottom portions of the 2½ turn inductor. Sheet 34c has holes 40 for vias that collect slots in sheets 34b and 34d. Top sheet 34d has slots 42 providing the top portions of the 2½ turn inductor.

Optionally, a ceramic sheet without holes or slots (not shown) can be disposed on top of the top sheet 34d so that slots 42 are covered.

Figure 6:
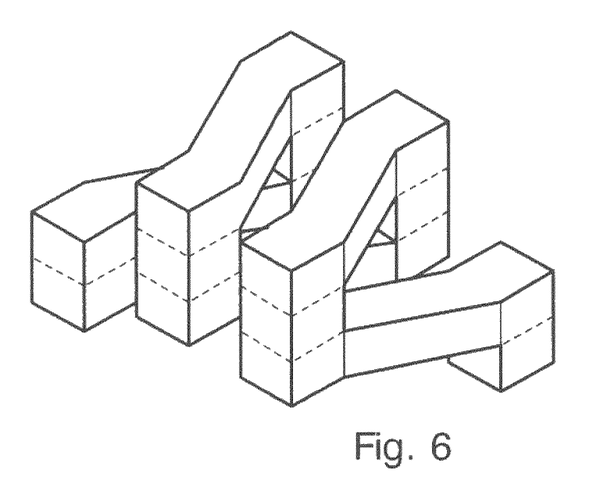
FIG. 6 shows in isolation the 2½ turn conductor embedded in the ceramic sheets illustrated in FIG. 5.

FIG. 6 shows. in isolation, the conductor of the 2½ turn inductor created by the sheets illustrated in FIG. 4. Preferably, the ceramic sheets are made of ferromagnetic or ferrimagnetic material that has a distributed air gap. Distributed air gap materials are well known in the art and typically comprise ferrite ceramic particles mixed with a non-ferromagnetic material such as glass. The non-ferromagnetic material creates microscopic gaps (i.e. air gaps, though they might not comprise air) between the ferromagnetic particles. The distributed air gap property of the ceramic material reduces the permeability of the ferromagnetic ceramic. Ferromagnetic materials with distributed air gaps are well known in the art.

In the present invention, a distributed air gap material results in an inductance value that changes with current. Specifically, when the ceramic material has a distributed air gap, the inductance of the inductor decreases with increasing current. The rate and amount of decrease are influenced by the shape of the conductor and other factors (e.g. filling fraction of the ferromagnetic material in the ceramic).

The present inventors have discovered that the variable inductance characteristic of the present inductors results in significant energy efficiency improvements in voltage regulators when the inductors are used as output inductors. The variable inductance characteristic results in a relatively large inductance value at low currents, which tends to decrease switching current ripple and therefore decrease switching losses in solid state switching devices (e.g. MOSFETs). The inductance falls to a desired low value at high currents and tends to have an insignificant effect on energy efficiency at high current.

Figure 7:
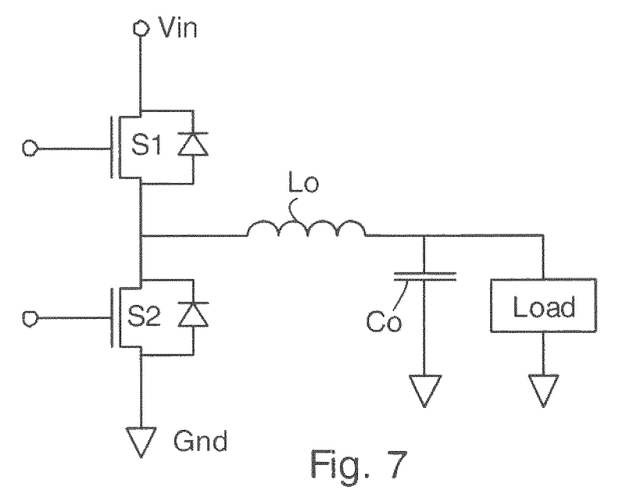
FIG. 7 shows a buck converter circuit. The present ceramic inductor increases the energy efficiency of voltage regulators such as buck converters.

FIG. 7 shows an exemplary buck regulator that can benefit from the present ceramic inductors. The buck regulator has top switch S1 and bottom switch S2, an output inductor Lo and an output capacitor Co. The buck regulator provides regulated electrical power to the load. The output inductor Lo receives pulses of current from the switches S1 S2. The output inductor performs the essential function of storing and releasing energy as well known in the art. In the present invention, an "output inductor" is defined as an inductor that is connected in series with the load. The output inductor necessarily opposes any change in current flowing through the load.

In the present invention, the present ceramic inductor is used for the output inductor Lo. Hence, the output inductor Lo has an inductance that decreases with increasing output current (i.e. current supplied to the load). A high inductance at low output current to increase the energy efficiency of the voltage regulator circuit because a high inductance results in a smaller switching current ripple, and consequently lower switching losses in the switches S1 S2. Hence, the energy efficiency at low output current is significantly improved, and the energy efficiency at high output current will not be significantly affected. The low ohmic resistance of the present inductors maintains high efficiency at high current.

Preferably, the inductance of the output inductor decreases by at least 10%, preferably 20%, 30%. 40%, 50%, or 75% or more at zero output current (maximum inductance) to the maximum rated current (minimum inductance) of the voltage regulator. The geometry of the present inductors, and distributed air gap characteristics will determine the amount of decrease in the inductance with current. Specifically, as noted above, the width 33 of the conductor largely determines the amount of decrease of inductance over the output current range.

Figure 8:
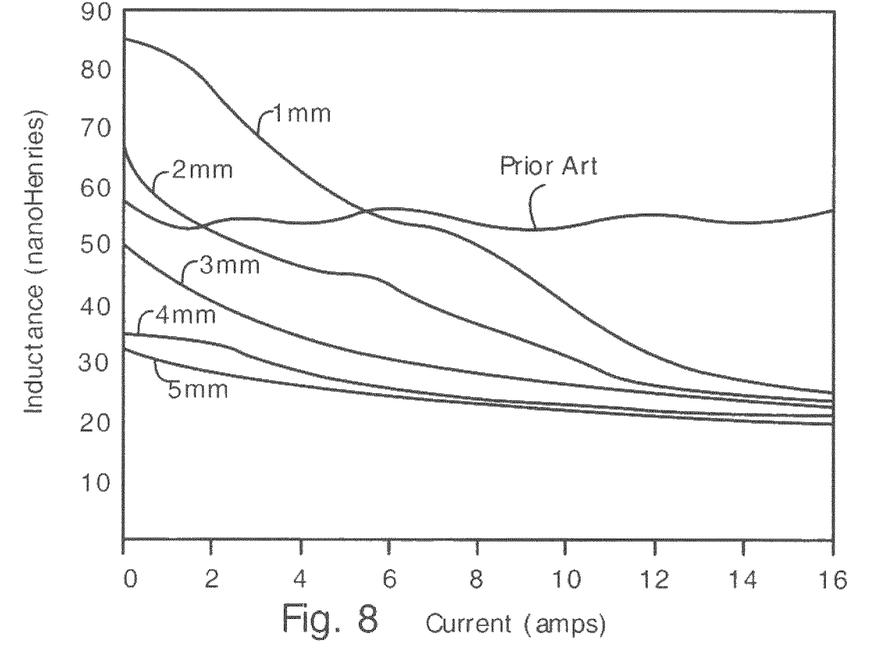
FIG. 8 shows a plot of inductance versus current for several inductors according to the present invention having different conductor widths.

FIG. 8, for example, shows inductance versus output current plots for five ceramic inductors according to the present invention. The plots represent. inductances for conductors that are 1 mm, 2 mm, 3 mm, 4 mm, and 5 mm wide. The inductors represented in FIG. 8 have a straight conductor about 15 mm long. The 1 mm wide inductor has an inductance that decreases from about 85 nH to about 25 nH. The 5 mm wide inductor has an inductance that decreases from about 30 nH to about 20 nH. The decrease in inductance is largest for inductors having narrow conductors. Also illustrated in FIG. 8 is a plot for a conventional fixed inductor according to the prior art. The prior art inductor has an essentially constant inductance over the operating current range (0-16 amps).

Typically, for improving the low current energy efficiency of voltage regulators, the decrease in inductance should be large, and perhaps as large as practical. Hence, for the greatest energy efficiency, the conductor should be as narrow as possible. Specifically, the 1 mm wide conductor of plot 1 will provide a greater energy efficiency (at low current) than the 5 mm wide conductor of plot 5. Of course, a narrow conductor will tend to have a higher to ohmic resistance, and the ohmic resistance losses present performance tradeoffs with improvements in switching losses provided by the high inductance values at low output current.

The inductance of each inductor represented in FIG. 8 decreases by at least 25% or more over the operating current range of the voltage regulator (0-16 amps). At a maximum rated current of the voltage regulator (about 16 amps in the example of FIG. 8), the inductance value is preferably less than 75% or 50% of the inductance value at zero current. The inductance can also drop by 80% or 90% over the operating range. Plot 1 for the 1 mm wide conductor, for example, indicates a decrease of about 70%.

Figure 9:
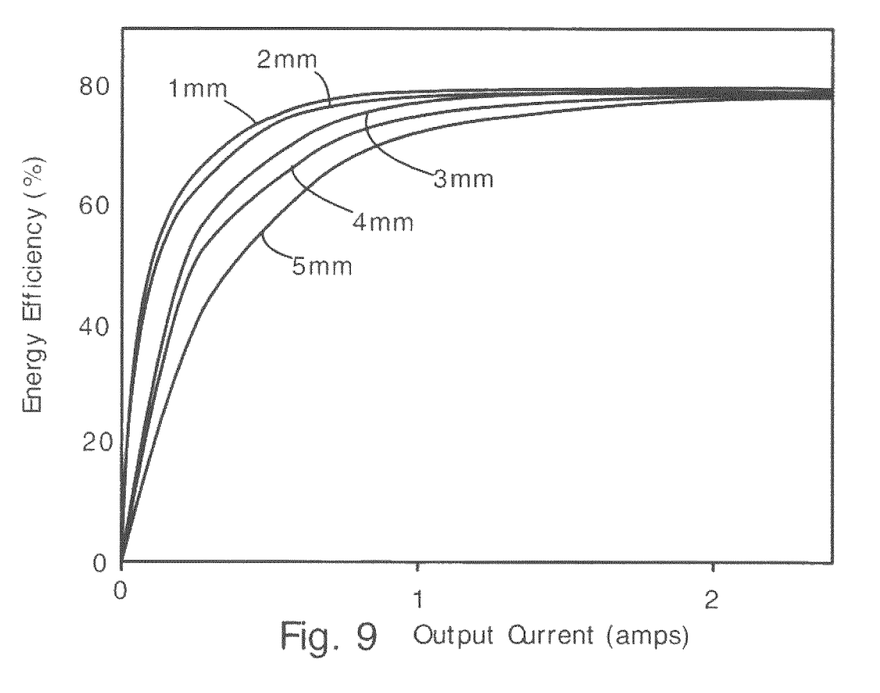
FIG. 9 shows a plot of energy efficiency versus output current for buck regulators having variable-inductance output inductors with different conductor widths.

FIG. 9 shows a plot of energy conversion efficiency versus output current for the same five buck regulators (i.e. regulators according to the circuit of FIG. 7) having variable-inductance ceramic inductors according to the present invention. The inductors have conductors with widths of 1 mm, 2 mm, 3 mm, 4 mm, or 5 mm. It is clear from FIG. 9 that using the inductor with a 1 mm wide conductor in the buck converter results in a substantially greater energy efficiency at low currents compared to the inductors with wider conductors. The energy efficiency is essentially the same for the different inductors at currents greater than about 2 amps, and all the way up to the maximum rated current of about 16 amps. The increase in low current energy efficiency provided by the small width inductor (1 mm width) over the wider inductors is due to the large decrease in inductance with increasing current illustrated in FIG. 8. Hence, in the present invention, inductors with large changes in inductance are generally preferred in the invention.

The variable inductance characteristic of the present inductors increases the energy efficiency of buck converters and many other kinds of voltage regulators. In order to provide the benefit of increased energy efficiency, the present variable inductor should be used as the output inductor in the voltage regulator. Specific examples of voltage regulators that can benefit from output inductors with variable inductance include boost converters, buck-boost converters, flyback converters, full bridge converters, resonant converters, and Cuk converters (described in U.S. Pat. No. 4,257,087 which is herein incorporated by reference).

Also, it is important to note that this preference (i.e. the preference for large decreases in inductance with increasing output current) is not specific to buck-type converters. The variable-inductance inductors of the present invention can be used in many different kinds of voltage regulators, and in every kind of voltage regulator, a large decrease in inductance will provide the greatest improvement in energy efficiency at low output current.

It will be clear to one skilled in the art that the above embodiment may be altered in many ways without departing from the scope of the invention. Accordingly, tile scope of the invention should be determined by the following claims and their legal equivalents.

What is claimed is:

1. A method for making an inductor, comprising the steps of:
    a) forming a slot in a first green ceramic sheet, wherein the slot continuously extends in a direction parallel with a major surface of the first green ceramic sheet;
    b) forming at least one via hole in a second green ceramic sheet at a location corresponding to one end of said slot, a second end of said continuous extended slot extending to another, different via in said second green ceramic sheet or another green ceramic sheet;
    c) filling the continuous extended slot with conductive paste;
    d) filling the at least one via hole with conductive paste;
    e) assembling the green ceramic sheets in a stack, such that the at least one via hole and the continuous extended slot are joined at both end of the slot; and
    f) heating the stacked ceramic sheets until sintered together and the conductive paste in said via and slot forms a solid conductor.

2. The method of claim 1, further comprising the step of forming a second via hole in the second green ceramic sheet, wherein, in step (e), the second via hole is joined with the continuous extended slot at a second end of the continuous extended slot, whereby the at least one via hole is electrically connected by the conductive paste or solid conductor in the slot.

3. The method of claim 1, wherein the conductor has a thickness equal to a thickness of the ceramic sheet having the slot.

4. The method of claim 1, wherein the ceramic sheets comprise ferrite and the solid conductor comprises sintered metal particles.

5. The method of claim 1, wherein the ceramic sheets each have a thickness in the range of 0.001 to 0.05 inches.

6. The method of claim 1, wherein the ceramic sheets comprise a distributed air gap ceramic material.

7. The method of claim 1, wherein said step of forming a slot includes the further step of
    selecting a width of said slot in accordance with a desired variation in inductance of said inductor with current in said inductor.

* * * * *